United States Patent
Denholm et al.

(10) Patent No.: US 11,240,300 B2
(45) Date of Patent: Feb. 1, 2022

(54) SUMMARY OF A RESOURCE

(71) Applicant: INTERNATIONAL BUSINESS MACHINES CORPORATION, Armonk, NY (US)

(72) Inventors: Ashleigh Shona Denholm, Southampton (GB); Emma Jane Dawson, Eastleigh (GB); Jack Peter Wadsted, Southampton (GB); Eunjin Lee, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/705,399

(22) Filed: Dec. 6, 2019

(65) Prior Publication Data

US 2021/0176308 A1 Jun. 10, 2021

(51) Int. Cl.
*G06F 15/16* (2006.01)
*H04L 29/08* (2006.01)

(52) U.S. Cl.
CPC ...... *H04L 67/1076* (2013.01); *H04L 67/1014* (2013.01); *H04L 67/1078* (2013.01); *H04L 67/32* (2013.01)

(58) Field of Classification Search
CPC . H04L 67/1076; H04L 67/1078; H04L 67/32; H04L 67/1014
USPC ........................................................ 709/203
See application file for complete search history.

(56) References Cited

U.S. PATENT DOCUMENTS

| | | | | |
|---|---|---|---|---|
| 7,155,489 B1* | 12/2006 | Heilbron | ............. | G06F 16/9577 709/217 |
| 7,702,675 B1* | 4/2010 | Khosla | ..................... | H04L 61/15 707/710 |
| 7,788,262 B1* | 8/2010 | Shirwadkar | ............. | G06F 16/36 707/737 |
| 9,678,618 B1* | 6/2017 | Schrock | ................ | G06F 16/954 |
| 2003/0164848 A1* | 9/2003 | Dutta | .................... | G06F 16/957 715/729 |
| 2005/0119957 A1* | 6/2005 | Faber | ................. | G06Q 30/0283 705/35 |

(Continued)

FOREIGN PATENT DOCUMENTS

CN 101079847 B 5/2010

OTHER PUBLICATIONS http://www.echoecho.com/, "EchoEcho.Com", EchoEcho.Com—Web Hosting—JavaScript Tutorial—HTML tutorial, Accessed on Sep. 26, 2019, 1 page.

(Continued)

*Primary Examiner* — Moustafa M Meky
*Assistant Examiner* — Thorne E Waugh
(74) *Attorney, Agent, or Firm* — Teddi E. Maranzano (57) ABSTRACT

Concepts for automatically generating a summary of a resource are presented. One example comprises analyzing at least a portion of electronic content comprising a reference to a resource to determine a context identifier for the electronic content, the context identifier describing subject-matter of the electronic content. Content of the resource is also analyzed to determine one or more content identifiers for the resource, the one or more content identifiers describing subject-matter of the resource. A summary of the resource is then generated based on the context identifier and the one or more content identifiers.

20 Claims, 4 Drawing Sheets

(56) References Cited

U.S. PATENT DOCUMENTS

| | | | |
|---|---|---|---|
| 2012/0166931 A1* | 6/2012 | Alonso | G06F 16/24556 |
| | | | 715/234 |
| 2013/0173569 A1* | 7/2013 | Pearcy | G06F 16/9535 |
| | | | 707/706 |
| 2015/0100503 A1* | 4/2015 | Lobo | G06Q 10/103 |
| | | | 705/301 |
| 2015/0220500 A1 | 8/2015 | Katic | |
| 2017/0046406 A1* | 2/2017 | Ganesan | G06F 16/951 |
| 2017/0109328 A1 | 4/2017 | Kim | |
| 2018/0075139 A1* | 3/2018 | Sadovsky | G06F 16/345 |
| 2018/0173682 A1 | 6/2018 | Yoo | |
| 2019/0034530 A1* | 1/2019 | Linn | G06F 16/2477 |
| 2020/0088523 A1* | 3/2020 | Wood | G01C 21/206 |
| 2020/0089803 A1* | 3/2020 | Denholm | G06F 40/279 |
| 2020/0396314 A1* | 12/2020 | Moon | G06F 16/9566 |

OTHER PUBLICATIONS https://api.slack.com/docs/message-link-unfurling#classic_unfurling, "Unfurling links in messages", slack api, Accessed on Sep. 26, 2019, pp. 1-33.

https://natural-language-understanding-demo.ng.bluemix.net/, "Natural language Understanding", WATSON™ / Demo, Accessed on Sep. 26, 2019, 2 pages.

https://ogp.me/, "The Open Graph protocol", Accessed on Sep. 26, 2019, 8 pages.

Wikipedia, "JavaScript", https://en.wikipedia.org/wiki/JavaScript#Security, Accessed on Sep. 26, 2019, 30 pages.

Wikipedia, "JavaScript", https://en.wikipedia.org/wiki/JavaScript, Accessed on Sep. 26, 2019, 1 page.

* cited by examiner

SUMMARY OF A RESOURCE

BACKGROUND

The present invention relates generally to resources (sometimes referred to as 'web resources'), and more particularly to a method for automatically generating a summary of a resource.

In an example, when a first person is interacting with a second person via an electronic chat or messaging application, the first person may provide (within an electronic message) a link to a web resource, such as a webpage or electronic document available on the Internet. In some instances, the second person may need to use (e.g. click, activate, or copy and employ) the link in order to review the web resource and identify and/or assess the relevance of the web resource and its content.

SUMMARY

According to an embodiment of the present invention there is provided a computer-implemented method for automatically generating a summary of a resource. The method comprises analyzing at least a portion of electronic content comprising a reference to a resource to determine a context identifier for the electronic content, the context identifier describing subject-matter of the electronic content. The method also comprises analyzing content of the resource to determine one or more content identifiers for the resource, the one or more content identifiers describing subject-matter of the resource. A summary of the resource is then generated based on the context identifier and the one or more content identifiers.

According to another embodiment of the invention, there is provided a computer program product for automatically generating a summary of a resource. The computer program product comprises a computer readable storage medium having program instructions embodied therewith, the program instructions executable by a processing unit to cause the processing unit to perform a method according to a proposed embodiment.

According to another embodiment of the invention, there is provided a processing system comprising at least one processor and the computer program product according to an embodiment. The at least one processor is adapted to execute the computer program code of said computer program product.

According to another embodiment of the invention, there is provided a system for automatically generating a summary of a resource. The system comprises a first analysis component configured to analyze at least a portion of electronic content comprising a reference to a resource to determine a context identifier for the electronic content, the context identifier describing subject-matter of the electronic content. The system also comprises a second analysis component configured to analyze content of the resource to determine one or more content identifiers for the resource, the one or more content identifiers describing subject-matter of the resource. The system further comprises a processing unit configured to generate a summary of the resource based on the context identifier and the one or more content identifiers.

BRIEF DESCRIPTION OF THE DRAWINGS

Embodiments of the present invention will now be described, by way of example only, with reference to the following drawings, in which.

DETAILED DESCRIPTION

It should be understood that the Figures are not drawn to scale, and that the same reference numerals are used throughout the Figures to indicate the same or similar parts.

In an example, when a first person is interacting with a second person via an electronic chat or messaging application, the first person may provide (within an electronic message) a link to a web resource, such as a webpage or electronic document available on the Internet. In some instances, the second person may need to use (e.g. click, activate, or copy and employ) the link in order to review the web resource and identify and/or assess the relevance of the web resource and its content.

A summary of the web resource within the chat or messaging application may be displayed. Such a summary typically conveys a first, small portion of content of the web resource (such as the first few lines of textual content or a portion of graphical content at the start of the resource). Accordingly, the second person may need to click, activate, or copy and paste the link in order to review the web resource and identify and/or assess the relevance of the web resource and its content.

By way of example, consider an instance where a first person working on a security project is discussing security issues of a programming language with a second person via an electronic messaging application. The first user pastes a link to a web page containing related information into a message to the second user. A summary of the web page may be automatically included in the message to the second user, wherein the summary consists of the first two paragraphs of the web page. However, the reason this first user wanted to share the link was because of a Security section situated towards the end of the web page, and not generally because of the programming language, itself. The second user may therefore dismiss the web page as not being relevant, based on the summary.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, according to embodiments of the present invention, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments of the present invention generate a summary of a resource (such as a web page or electronic document) by taking account of the context within which the resource is referenced. By determining subject-matter of electronic content, the reason(s) why the reference to the resource has been included in/with the electronic content may be appreciated. Content from the resource which is most closely related to the reason(s) or context can be included in a more relevant or useful summary of a resource.

Accordingly, a topic, subject or context of electronic content (such as a chat session or message) is determined within which a reference to a resource is provided. The topic, subject, or context is used to identify relevant, pertinent and/or important content of the resource. Such identified content of the resource may then be used to create a summary of the resource that is tailored to the topic, subject or context of the electronic content. This may enable a highly-relevant or useful resource summary to be provided which is tailored to the specific circumstances in which a reference to the resource is provided.

Embodiments can be implemented in conjunction with content creation or editing systems to automatically generate improved summaries of referenced resources, and these summaries can be tailored to aspects of the content within which the references are provided. For example, embodiments can be employed in conjunction with document processing applications, chat applications, messaging applications, word processing applications, document creation applications, etc. The electronic content includes one or more messages of a chat or messaging application. The electronic content that includes a reference may thus comprise one or more messages of a chat or messaging application. In other examples, the electronic content that includes a reference can be content of an electronic document (such as a word processing document, electronic presentation, or the like).

Exemplary embodiments may therefore automatically generate a summary of a reference (e.g. linked or identified) web resource. Improved and dynamic resource summary generation may therefore be provided by the embodiments.

Embodiments can generate a tailored summary of a referenced resource that can accompany (e.g. rendered, displayed) the reference. This can be done by analyzing electronic content comprising the reference to the resource (to determine a context identifier describing subject-matter of the electronic content), and then analyzing content of the resource in consideration of the context identifier to determine relevant subject-matter or content of the resource. Embodiments may therefore assist in creating an improved summary of a referenced resource that only includes content of the resource which is relevant to the context in which the reference to the resource was provided.

In an embodiment, a tool for enabling automated generation of tailored or optimized summaries of referenced resources may therefore be provided. This may be used to edit or produce electronic content (such as a chat session, message or electronic document). Embodiments may therefore cater for problems associated with using default and/or generic approaches to summarize referenced resources which would otherwise result in poor/useless/irrelevant summaries of referenced resources.

By way of example, the electronic content may comprise textual content separate from the reference. Analyzing at least a portion of the electronic content may comprise: processing the textual content with a natural language processing (NLP) algorithm to identify a topic or context of the textual content; and determining the context identifier based on the identified topic or context. This may facilitate automation of embodiments and thereby avoid a need for human or external control. For instance, NLP algorithms or concepts may be leveraged to identify one or more keywords indicative of a topic of the electronic content (and thus a context within which the reference to the resource is provided).

The content of the resource may comprise textual content. Analyzing content of the resource may comprise: processing the textual content of the resource with a natural language processing algorithm to identify a topic or context of the resource; and determining the one or more content identifiers based on the identified topic or context of the resource. Again, this may help to facilitate automation of embodiments and thereby avoid a need for human or external control. By way of example, NLP algorithms or concepts may be leveraged to identify one or keywords indicative of a topic of the content of the resource.

By way of example, generating a summary of the resource may comprise comparing the context identifier and the one or more content identifiers. Based on a result of the comparison, a summary may be generated based on a portion of the content of the resource. Thus, a comparison of a topic of context within which the reference is provided may then be compared against one or more topics within the content of resource. In this way, a summary may be generated based on identified matches to create a more focused and relevant summary.

In some embodiments, each of the one or more content identifiers for the resource may be associated with a respective portion of the content of the resource. Generating a summary based on a portion of the content of the resource may comprise: responsive to identifying that a first content identifier matches a context identifier, generating a summary based on the portion of the content of the resource associated with the first content identifier. For instance, if one match is found in the resource, the summary may be generated using the section of the content of the resource where the match is found.

Furthermore, in some embodiments, there may be three or more content identifiers. Generating a summary based on a portion of the content of the resource may comprise: responsive to identifying that at least three of the content identifiers match a context identifier, generating a summary based on a section of the content of the resource comprising the most portions associated with a content identifier matching a context identifier. In this way, the summary may be generated using the section of the resource containing the most matches.

In some embodiments, generating a summary based on a portion of the content of the resource may comprise: responsive to identifying that none of the one or more content identifiers match the context identifier, generating a summary based on a predetermined default selection of the content of the resource. For instance, if there no match identified, a default preview may be used.

Embodiments may further comprise appending the generated summary to the reference to a resource. For instance, the generated summary may be rendered and displayed next to the reference to the resource.

The reference may comprise a uniform resource identifier (URI). Accordingly, the term 'reference' refers to a string of characters that unambiguously identifies a particular resource. Typically, to guarantee uniformity, such references follow a predefined set of syntax rules, but also maintain extensibility through a separately defined hierarchical naming scheme. Such identification enables interaction with representations of the resource over a network, using specific protocols. A common form of URI is the Uniform Resource Locator (URL), frequently referred to as a web address.

The term 'resource' refers to a web resource. A web resource, or simply resource, comprises any identifiable electronic resource. Resources are typically identified using URIs and URLs. In the Semantic Web, web resources and their semantic properties are described using a Resource Description Framework, which is a general method for modeling information that is implemented in web resources. A web resource may, for example, comprise a webpage, electronic file, or an electronic document.

Accordingly, embodiments may provide a tool for assisting in the creation of improved resource summaries that contain higher quality (i.e. more relevant) information given a context in which the resources are referenced. This may help to create electronic content (such as that of a chat session, message or electronic document) that includes a reference to a resource which is automatically accompanied by a tailored summary of the reference. In this way, a user may be able to quickly and easily assess the relevance or usefulness of a reference provided as part of electronic content.

Embodiments may be useful for a wide range of applications, such as chat applications, message applications, word processing applications, presentation creation applications, electronic document creation and/or editing applications, etc.

By way of further example, embodiments may comprise extensions to existing applications. In this way, a conventional messaging application or electronic document creation/editing application may be upgraded by implementing or 'retro-fitting' a proposed embodiment.

Figure 1:
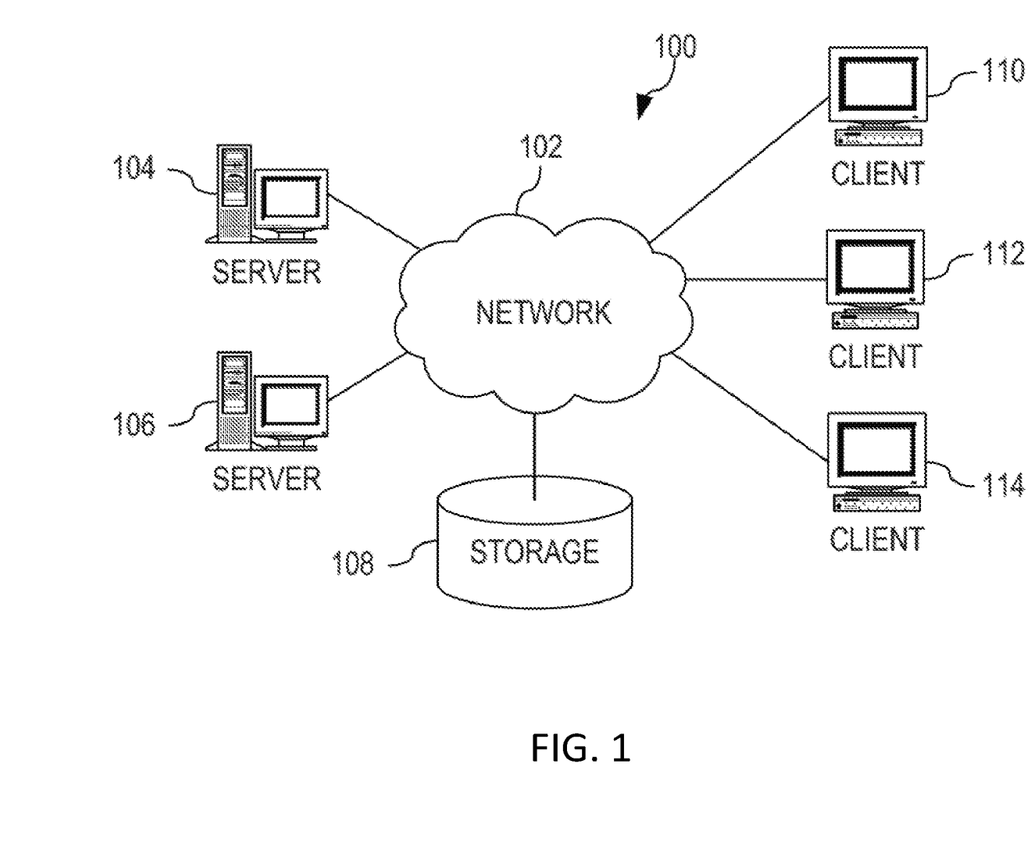
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
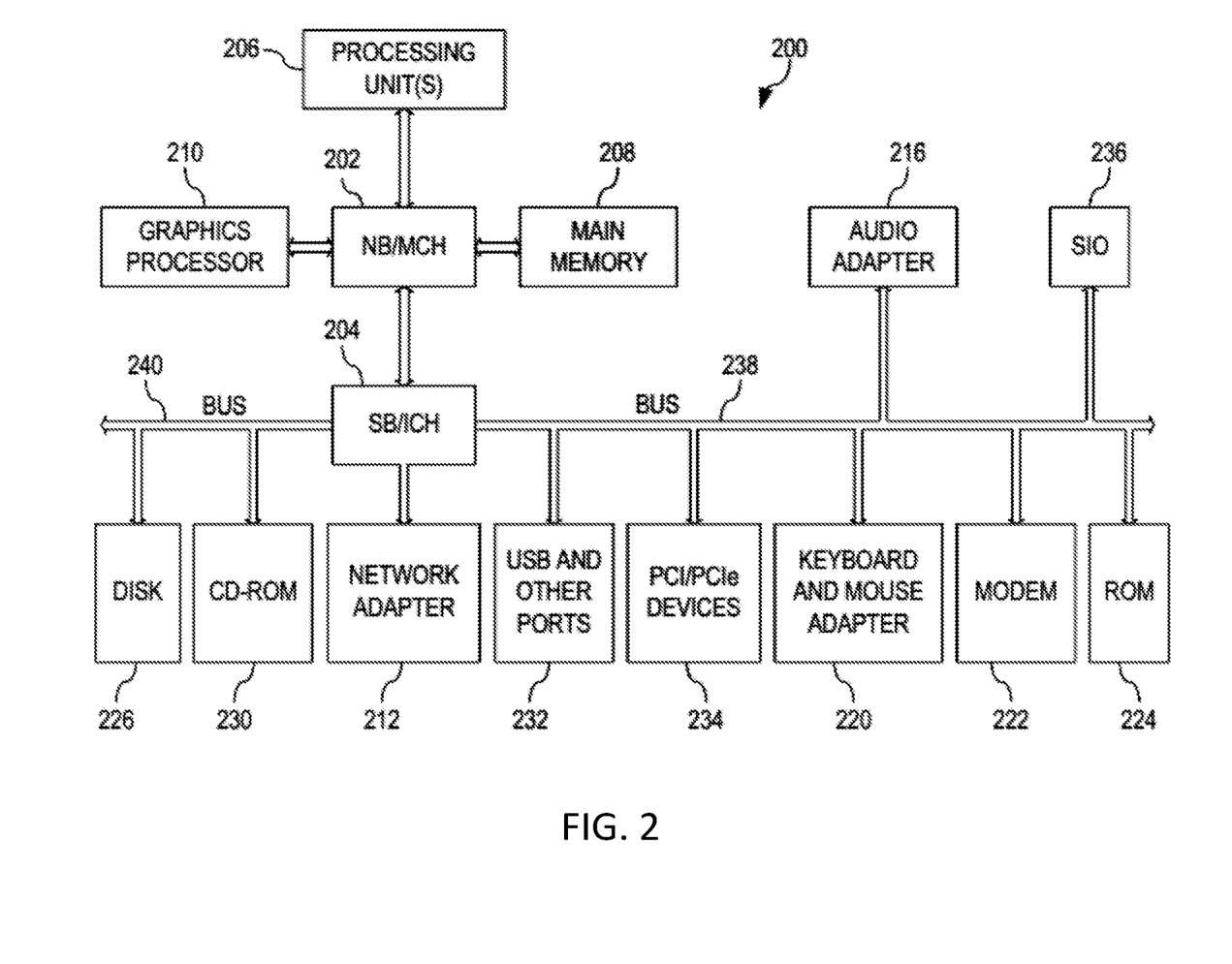
FIG. 2 is a block diagram of an example system in which aspects of the illustrative embodiments may be implemented.

FIG. 2 is a block diagram of an example system 200 in which embodiments of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be any commercially available operating system. An object-oriented programming system may run in conjunction with the operating system and provides calls to the operating system from the object oriented programs or applications executing on system 200.

The server of system 200 may run any operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code. The computer usable program code may be stored in a memory such as, for example, main memory 208, ROM 224, or in one or more peripheral devices 226 and 230.

A bus system includes one or more buses, such as first bus 238 or second bus 240 as shown in FIG. 2. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may include a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may allow for seamless generation and integration of a summary of a resource into electronic content, wherein the summary takes account of the subject-matter (e.g. topic, subject, focus, etc.) of the electronic content. This may be done by processing the textual content of the electronic content and/or the resource with one or more natural language processing algorithms to identifier pertinent information in the electronic content and/or the resource.

Figure 3:
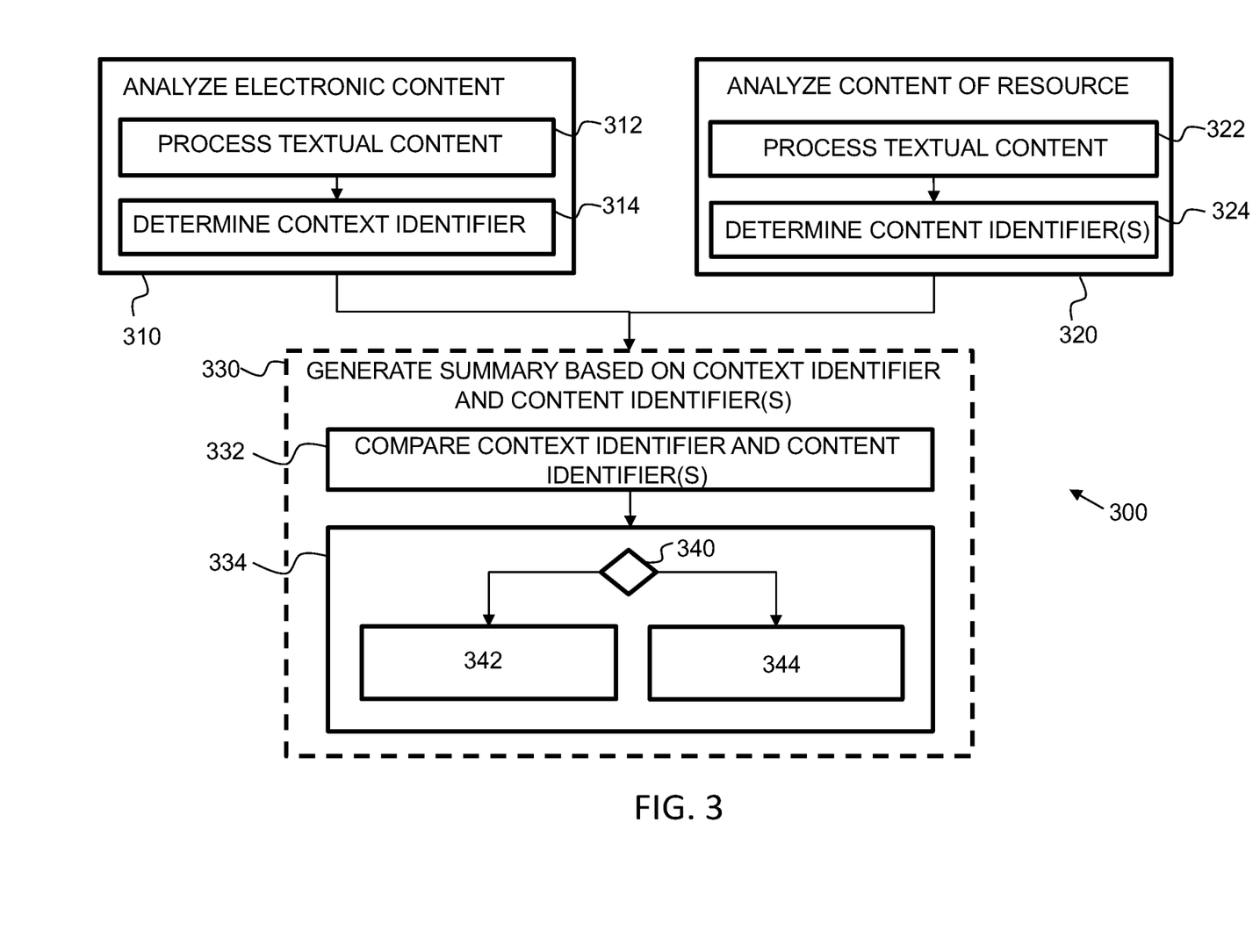
FIG. 3 is a flow diagram of an exemplary embodiment of a computer-implemented method for automatically generating a summary of a resource that is referenced in electronic content.

FIG. 3 is a flow diagram of an exemplary embodiment of a computer-implemented method 300 for automatically generating a summary of a resource that is referenced in electronic content. In the example, the reference to the resource comprises a URI and is provided within a message of a chat or messaging application. Accordingly, the electronic content of this example comprises one or more messages of the chat or messaging application. Also, the resource comprises an electronic document (e.g. electronic word processing document, spread sheet, digital image, or presentation) containing electronic document content (such as text and graphics).

Step 310 of the method 300 comprises analyzing at least a portion of electronic content that comprises the reference to the resource so as to determine a context identifier describing subject-matter of the electronic content. More specifically, in this example, the electronic content comprises textual content that is separate from the reference. The step 310 of analyzing at least a portion of the electronic content comprises two stages, namely: step 312 of processing the textual content with an NLP algorithm to identify a topic or context of the textual content; and step 314 of determining the context identifier based on the identified topic or context. For instance, an NLP algorithm may be employed to identify a keyword indicative of a topic of the electronic content (and thus a context within which the reference to the resource is provided). The identified keyword may then be used as the context identifier for the electronic content.

Step 320 of the method 300 comprises analyzing content of the resource to determine one or more content identifiers describing subject-matter of the resource. Specifically, in this example, the content of the resource comprises textual content. The step 320 of analyzing content of the resource comprises two stages, namely: step 322 of processing the textual content of the resource with an NLP algorithm to identify a topic or context of the resource; and step 324 of determining the one or more content identifiers based on the identified topic or context of the resource. For instance, an NLP algorithm (such as that used in step 312) may be employed keywords indicative of one or more topics of the content of the resource.

It will therefore be appreciated that completion of steps 310 and 320 provides a context identifier for the electronic content, and one or more content identifiers for the resource. Steps 310 and 320 may be undertaken independently from each other and, thus in any order (or in parallel).

Based on the context identifier and the one or more content identifiers (provided by steps 310 and 320), a summary of the reference is generated in step 330. More specifically, in this example embodiment, the step 330 of generating a summary of the resource comprises: comparing the context identifier and the one or more content identifiers (step 332); and based on a result of the comparison, generating a summary based on a portion of the content of the resource (step 334).

By way of example, in step 334, the result of the comparison made in step 332 is used to determine if the summary is to be generated. Step 334 comprises determining (in step 340) if the context identifier matches one or more of the content identifiers.

Responsive to identifying that none of the one or more content identifiers match the context identifier, the method proceeds to step 342 wherein a summary of the resource is generated based on a predetermined default selection of the content of the resource (e.g. the first four lines of textual content of the resource).

Conversely, responsive to identifying that a first content identifier of the one or more content identifiers matches a context identifier, the method proceeds to step 344 wherein a summary is generated based on a portion of the content of the resource associated with the first content identifier.

Having generated a summary of the resource, the generated summary may, for example, be automatically appended to the reference. In this way, the embodiment of FIG. 3 may be employed for the purpose of generating a summary of a referenced resource which can then be rendered or displayed in combination with the reference to the resource.

Although the resource of the exemplary embodiment of FIG. 3 has been detailed as comprising an electronic document, in other embodiments the resource may be a web resource such as a webpage.

Also, the electronic content of the exemplary embodiment of FIG. 3 has been detailed as comprising one or more messages of a chat or messaging application. In other embodiments, the electronic content may comprise content of an electronic document that is created and/or modified by a user (such as electronic word processing document for example).

Embodiments of the present invention may be employed to generate a summary of a referenced resource that is tailored to be relevant to a context or topic of electronic content within which the reference is provided. By providing (e.g. rendering/displaying) the generated summary with the reference, a user may not need to use (e.g. activate, click, follow, etc.) the reference to assess if the referenced resource is relevant and/or useful. Accordingly, a user can quickly and accurately assess the relevance of a shared reference or link to an external resource.

For example, in generating a summary of a referenced resource, embodiments may 'scrape' a current conversation (within which the reference is provided) as well as the referenced resource. The scraped content may then be compared for keyword matches. If a match is found, the corresponding section of the resource may be used to create a more focused and/or relevant summary of the resource for the current conversation.

To further aid understanding of the proposed concept(s), a purely exemplary implementation of a proposed embodiment will now be described when a user of a chat application pastes a link to a web page (e.g. a URL) into a message intended for a recipient.

The linked web page and the chat history of the chat application is analysed.

The web page HTML content data is scraped, and this data is parsed to assess the hierarchy of different elements on the page, breaking the data down into logical sections by analysing where the heading tags are <h1>, <h2>, etc.

The chat history is analysed in the following way. A number of messages are selected (e.g. either the last 15 minutes' worth or 500 words, depending on which provides more data), and the data is processed through an NLP tool and identified keywords are stored for comparison.

Keywords from each section of the web page are then compared to those from the chat history. If there is a significant match, such as exceeding a predefined percentage of similarity, between a section and the chat history, this section is used as the link preview's text (i.e. employed for the summary). If there is no significant match, such as a match not exceeding a predefined percentage of similarity, a default preview is used (e.g. the first section on the web page). If there are multiple significant matches, the section furthest up the hierarchy (for example an <h1> tag rather than an <h4> tag) is used for the preview.

In another exemplary embodiment, a user pastes a link to a webpage into a messaging service. The conversation is scraped from the conversation start point (or where the conversation resumed) using an NLP algorithm to gather key concepts of the conversation. HTML code of the linked webpage is scraped to parse in order to access the hierarchy of different elements on the page, breaking the data down into logical sections for example <h1></h1> <p></p>. The webpage is then searched to identify sections relevant to key concepts of the conversation. If only one concept is found in the webpage, a summary is rendered using the section where that concept is found. If more than one key concept is found in the conversation, the algorithm would search the page for all key concepts. The summary is then rendered using the section where most of the concepts are found. If the concepts are spread across the webpage, the invention will render the summary from the highest rated concept. If there is no significant match, a default preview/summary of the webpage is used for the summary.

Figure 4:
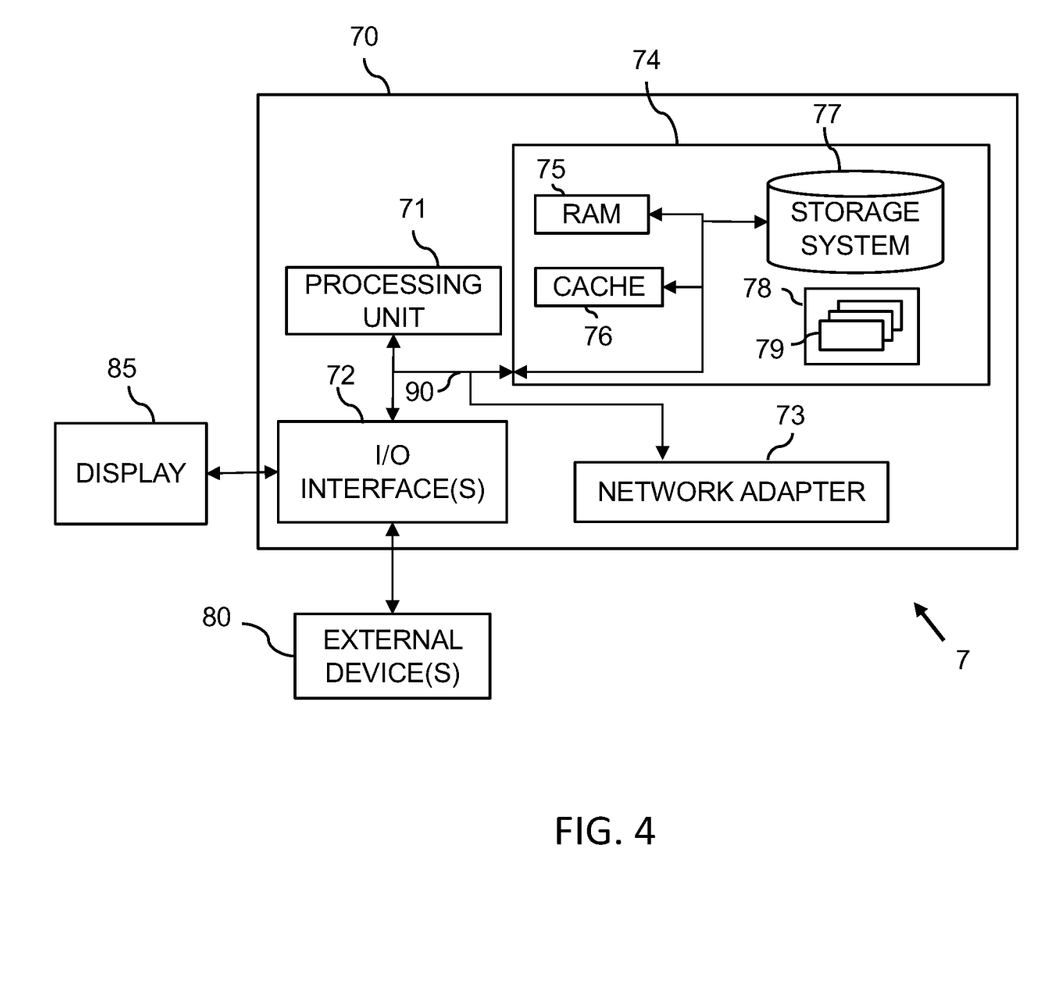
FIG. 4 illustrates a system according to another embodiment.

By way of further example, as illustrated in FIG. 4, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random-access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In embodiments of the present invention, a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating a summary of a resource, the method comprising:
    scraping electronic content from a current conversation within which is provided a referenced resource, wherein the conversation is scraped beginning from a defined starting point (in time or in number of words);
    scraping a web page HTML content data, wherein the web page HTML content data is the referenced resource;
    analyzing at least a portion of the scraped electronic content to determine a context identifier for the electronic content, the context identifier describing subject-matter of the electronic content;
    analyzing content of the referenced resource to determine one or more content identifiers for the resource, the one or more content identifiers describing subject-matter of the referenced resource; and
    in response to the context identifier significantly matching one or more of the content identifiers, generating a summary of the portion of the referenced resource that matches the context identifier.

2. The method of claim 1, wherein the electronic content comprises textual content separate from the reference, and wherein analyzing at least a portion of the electronic content comprises:
    processing the textual content with a natural language processing algorithm to identify keywords indicative of a topic or context of the textual content; and
    determining the context identifier based on the identified topic or context.

3. The method of claim 1, wherein the content of the resource comprises textual content, and wherein analyzing content of the resource comprises:
    processing the textual content of the resource with a natural language processing algorithm to identify a keyword indicative of a topic or context of the resource; and
    determining the one or more content identifiers based on the identified topic or context of the resource.

4. The method of claim 1, wherein generating a summary of the resource comprises:
    comparing the context identifier and the one or more content identifiers; and
    based on a result of the comparison, generating a summary based on a portion of the content of the resource.

5. The method of claim 4, wherein each of the one or more content identifiers for the resource is associated with a respective portion of the content of the resource, and wherein generating a summary based on a portion of the content of the resource comprises:
    responsive to identifying that a first content identifier of the one or more content identifiers matches a context identifier, generating a summary based on the portion of the content of the resource associated with the first content identifier.

6. The method of claim 5, wherein the one or more content identifiers comprise three or more content identifiers, and wherein generating a summary based on a portion of the content of the resource comprises:
    responsive to identifying that at least three of the content identifiers match a context identifier, generating a summary based on a section of the content of the resource comprising the most portions associated with a content identifier matching a context identifier.

7. The method of claim 4, wherein generating a summary based on a portion of the content of the resource comprises:
    responsive to identifying that none of the one or more content identifiers match the context identifier, generating a summary based on a predetermined default selection of the content of the resource.

8. The method of claim 1, further comprising: appending, rendering, and displaying the generated summary to the reference to a resource.

9. The method of claim 1, wherein the reference comprises a uniform resource identifier, and wherein the resource comprises an electronic document comprising electronic document content.

10. The method of claim 9, wherein the resource comprises a webpage.

11. The method of claim 1, wherein the electronic content comprises one or more messages of a chat or messaging application.

12. The method of claim 1, wherein the electronic content comprises content of an electronic document.

13. A computer program product for automatically generating a summary of a resource, the computer program product comprising a computer readable storage medium having program instructions embodied therewith, the program instructions executable by a processing unit to cause the processing unit to perform a method comprising:
    scraping electronic content from a current conversation within which is provided a referenced resource, wherein the conversation is scraped beginning from a defined starting point (in time or in number of words);
    scraping a web page HTML content data, wherein the web page HTML content data is the referenced resource;
    analyzing at least a portion of the scraped electronic content to determine a context identifier for the electronic content, the context identifier describing subject-matter of the electronic content;
    analyzing content of the referenced resource to determine one or more content identifiers for the resource, the one or more content identifiers describing subject-matter of the referenced resource; and
    in response to the context identifier significantly matching one or more of the content identifiers, generating a summary of the portion of the referenced resource that matches the context identifier.

14. The computer program product of claim 13, wherein the content of the resource comprises textual content, and wherein analyzing content of the resource comprises:
    processing the textual content of the resource with a natural language processing algorithm to identify a keyword indicative of a topic or context of the resource; and
    determining the one or more content identifiers based on the identified topic or context of the resource.

15. The computer program product of claim 14, wherein each of the one or more content identifiers for the resource is associated with a respective portion of the content of the resource, and wherein generating a summary based on a portion of the content of the resource comprises:

responsive to identifying that a first content identifier of the one or more content identifiers matches a context identifier, generating a summary based on the portion of the content of the resource associated with the first content identifier.

16. The computer program product of claim 15, wherein the one or more content identifiers comprise three or more content identifiers, and wherein generating a summary based on a portion of the content of the resource comprises:

responsive to identifying that at least three of the content identifiers match a context identifier, generating a summary based on a section of the content of the resource comprising the most portions associated with a content identifier matching a context identifier.

17. The computer program product of claim 13, wherein generating a summary of the resource comprises:

comparing the context identifier and the one or more content identifiers; and based on a result of the comparison, generating a summary based on a portion of the content of the resource.

18. A system for automatically generating a summary of a resource, the system comprising: one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

scraping electronic content from a current conversation within which is provided a referenced resource, wherein the conversation is scraped beginning from a defined starting point (in time or in number of words);

scraping a web page HTML content data, wherein the web page HTML content data is the referenced resource;

performing a first analysis of at least a portion of the scraped electronic content to determine a context identifier for the electronic content, the context identifier describing subject-matter of the electronic content;

performing a second analysis of a content of the referenced resource to determine one or more content identifiers for the resource, the one or more content identifiers describing subject-matter of the referenced resource; and in response to the context identifier significantly matching one or more of the content identifiers, generating a summary of the portion of the referenced resource that matches the context identifier.

19. The system of claim 18, wherein the electronic content comprises textual content separate from the reference, and wherein the first analysis comprises:

processing the textual content with a natural language processing algorithm to identify a keyword indicative of a topic or context of the textual content; and determining the context identifier based on the identified topic or context.

20. The system of claim 18, wherein the content of the resource comprises textual content, and wherein the second analysis comprises:

performing a second natural language processing of the textual content of the resource with a natural language processing algorithm to identify a keyword indicative of a topic or context of the resource; and determining the one or more content identifiers based on the identified topic or context of the resource.

* * * * *